United States Patent Office 3,803,321
Patented Apr. 9, 1974

3,803,321
LONG LASTING ANTIBIOTIC COMPOSITION COMPRISING THE 3-PALMITIC ESTER OF THIAMPHENICOL
Uberto Maria Teotino and Davide Della Bella, Milan, Italy, assignors to Zambon S.p.A., Bresso, Milan, Italy
No Drawing. Original application May 2, 1969, Ser. No. 822,104, now Patent No. 3,652,607. Divided and this application Feb. 14, 1972, Ser. No. 226,292
Int. Cl. A61k 21/00
U.S. Cl. 424—312
1 Claim

ABSTRACT OF THE DISCLOSURE

The invention provides new thiamphenicol salts comprised in the general formula:

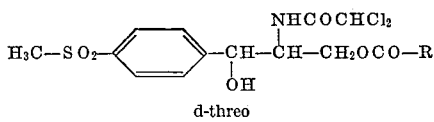

d-threo wherein R is an alkyl radical comprising from 13 to 17 carbon atoms. The new salts are characterized by a much more long-lasting activity than thiamphenicol alone.

---

This is a division of application Ser. No. 822,104, filed May 2, 1969, now U.S. Pat. No. 3,652,607.

The present invention refers to new thiamphenicol derivatives, which are particularly useful for obtaining antibiotic compounds having long-lasting activity. In particular the invention refers to new compounds comprised in the following general formula:

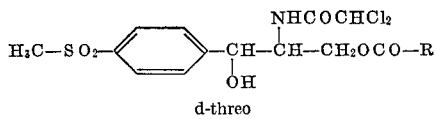

d-threo wherein R is an aliphatic radical comprising from 13 to 17 carbon atoms, to the processes for their preparation as well as to the therapeutic compositions which comprise the new compounds of the invention.

It is known that the chloramphenicol is a broad-spectrum antibiotic widely used. However, since the chloramphenicol possesses a very disagreeable and persistant taste, the esters thereof have been prepared by esterifying its hydroxyl in 3-position with aliphatic acids of high molecular weight.

These esters (U.S. Pat. 2,662,906) present with respect to chloramphenicol only the advantage of being tasteless although maintaining an unchanged activity.

As a matter of fact, Glazko, A. J. & Coll., Antibiotics & Chemiotherapy 8, 516, (1958) have demonstrated that the hematic levels obtained after oral supply of chloramphenicol and chloramphenicol palmitate are nearly identical and reach the maximum level within two hours, while nearly entirely disappearing after eight hours. The palmitate is the most widely used ester among the prepared ones. It is also known that the thiamphenicol is at present widely used because of the advantages which it presents with respect to the chloramphenicol: Kunin, C. M. and Finland, M., Proc. Soc. Exp. Biol. Chem. 103, 246, (1960), (there thiamphenicol is mentioned as "Thiocymetin," which is a trademark of the Winthrop Labts.).

It has now been surprisingly found that the activity of the thiamphenicol esters, which have been obtained by esterification of the hydroxyl in 3-position with high molecular weight aliphatic acids, is much more long-lasting than that of thiamphenicol.

In particular it has been found that the hematic levels obtained ester oral administration of thiamphenicol reach, with a behavior quite similar to that of chloramphenicol and of chloramphenicol esters, the maximum value after two hours and then decrease rapidly; on the contrary when equivalent quantities of an ester of thiamphenicol with a fatty acid, according to the present invention, are administered, the hematic levels increase slowly and are still low after two hours, then reach the maximum between the fourth and the eighth hour and maintain still good levels after 12 hours.

The advantage offered by such a medicine at long-lasting activity is evident when considering that the 3–4 daily administrations required by thiamphenicol, may be reduced to one administration only.

Experiments have been performed with two groups of Wistar rats, each group comprising 20 ♂ albin rats of 200 g. average weight; these have been treated, by means of a gastric probe, with thiamphenicol or with thiamphenicol palmitate in the form of syrupy micro-suspensions containing 2% of a suitable surfactant, in the particular case Tween 80.

The first group received an oral dose of 200 mg./kg. of thiamphenicol, while the second one received 333 mg./kg. of thiamphenicol palmitate, which dose is equivalent to 200 mg. of thiamphenicol. Five rats of each group were killed by bleeding 2, 4, 8 and 12 hours respectively after medicine administration, and the blood serum was separated at +4° C. The determination of the antibiotic amount in each of the obtained serum samples was carried out in a microbiological way, according to the method of the scalar broth-dilutions, using as test microorganism the *"Pasteurella boviseptica* Harvard" which is sensitive to 0.25 mcg./ml. of thiamphenicol. The reading of M.I.C. (minimum inhibitory concentration) was performed by direct turbidimetry after 18 h. from incubation at 37° C. The results obtained are reported in the following Table 1.

TABLE 1

Thiamphenicol concentrations in mcg. for ml. of serum after oral administration of thiamphenicol and thiamphenicol palmitate

| Rats | Thiamphenicol 200 mg./kg. drawing time in h. | | | | Thiamphenicol palmitate 333 mg./kg. drawing time in h. | | | |
|---|---|---|---|---|---|---|---|---|
| | 2 | 4 | 8 | 12 | 2 | 4 | 8 | 12 |
| 1 | 13 | 6 | 1.5 | 0.5 | 4.5 | 4.5 | 6 | 1.5 |
| 2 | 13 | 6 | 3 | 0.7 | 6 | 6 | 4.5 | 3 |
| 3 | 13 | 6 | 1.5 | 0.8 | 3 | 4.5 | 6 | 3 |
| 4 | 13 | 6 | 3 | 0.5 | 3 | 4.5 | 4.5 | 1.5 |
| 5 | 13 | 6 | 1.5 | 0.5 | 3 | 6 | 6 | 3 |
| Mean | 13 | 6 | 2.1 | 0.6 | 3.9 | 5.1 | 5.4 | 2.4 |
| ±o.s. | ±0 | ±0 | ±0.37 | ±0.06 | ±0.6 | ±0.37 | ±0.37 | ±0.37 |

Clinical experiences performed on men have confirmed the above reported results.

The compounds of the present invention may be prepared by reaction of the thiamphenicol with a compound of the formula: R—CO—X wherein R is an aliphatic radical having from 13 to 17 carbon atoms and X is OH, O—CO—R, Cl, Br, O—COOC$_2$H$_5$, under suitable conditions and in particular under conditions such as to allow the esterification of the hydroxyl in the 3-position only, while maintaining uneffected the hydroxyl in 1-position.

The reaction is preferably carried out letting the thiamphenicol to react with a slight excess of the chloride of the desired fatty acid, in the presence of alkaline or alkaline-earth bicarbonate or of pyridine, trialkylamine, N-alkyl-anilines, N,N-dialkyl-anilines, at a temperature comprised between 15° and 50° C.

A non-limitative example is reported hereinafter for illustrative purposes only.

EXAMPLE

Preparation of thiamphenicol palmitate 1,000 g. (2.8 moles) of thiamphenicol, 780 g. of pyridine and 2,500 g. of dimethylformamide are introduced into a 4-necks, 3 l. flask provided with reflux cooler, stirrer, thermometer and separatory funnel.

A clear, colorless solution is obtained under strong stirring. 780 g. (2.84 moles) of palmitoyl chloride are added over 75 minutes, while keeping under stirring; nearly instantly a white precipitate separates in amounts increasing as the addition of the palmitoyl chloride increases; the temperature rises from 22° to 36° C. As soon as the addition is completed the mixture is poured into a glass containing 3 liters of water. The white precipitate is collected by filtration under vacuum and washed with water until Cl− ions and the pyridine smell disappear. The product is dried in an air oven over 18 hours thus obtaining 1,435 g. of raw product having a M.P. 105°–109° C.

The raw product is placed in a 6 l. flask together with 840 g. of methyl alcohol and 3,860 g. of isopropyl ether; the mixture is refluxed up to complete solution, then is cooled to 5° C. and allowed to crystallize for 16–18 hrs.

The crystalline precipitate is collected by filtration under vacuum and dried at 50° C. in a stove with air circulation.

1,040 g. of thiamphenicol palmitate containing 59.9% of thiamphenicol are obtaied: M.P. 110–113° C., M. W. 594.66, $[\alpha]_{20°} = +18.5° \pm 0.5°$ (c.=1% in absolute ethyl alcohol).

Spectrophotometric characteristics: a solution in 95% ethyl alcohol shows the following maxima:

225 mμ; 226 mμ ($E_1$=15.0) and 273 mμ ($E_1^1$=13.5) and the following minima:

251±1 mμ and 271±1 mμ

The prepared producis a white or slightly ivory microcrystalline powder, odorless and tasteless. It is very soluble in dimethylformamide and tetrahydrofuran; soluble in acetone, ethylacetate and ethanol; water-insoluble. When dry it is stable in air and light. Its water-suspensions are stable when kept at nearly neutral pH.

Therapeutic directions and doses

The compounds of the present invention may be orally administered by means of pharmaceutical forms generally used for this kind of administration such as sugar-coated pills, capsules, tablets, syrups and so on.

The y may be administered once per day in amounts corresponding to 30 mg. of thiamphenicol for each kg. of the treated man.

We indicate hereinafter for illustrative purposes only, a typical composition for oral administration, to be used in flasks having 60 ml. capacity:

| | | |
|---|---|---|
| Thiamphenicol palmitate | g | 2.5 |
| Polyoxyethylenesorbitanmonooleate | g | 1.2 |
| Sodium benzoate | g | 0.24 |
| Methyl p.oxybenzoate | g | 0.07 |
| Propyl p.oxybenzoate | g | 0.01 |
| Anhydrous sodium citrate | g | 0.06 |
| Saccharose | g | 38.4 |
| Flavor | g | 0.3 |
| Distilled water q.s.a. | ml | 60 |

The polyoxyethylenesorbitanmonooleate is a surfactant while the benzoates are suitable conservative agents.

We describe hereinafter the procedure for preparing 45 liters of suspension (equivalent to 750 flasks each having a 60 ml. capacity) of the above indicated composition: 900 g. of polyoxyethylenesorbitanmonooleate are dissolved into 7 kg. of distilled water, the solution is poured into a china jar of 50 liters capacity and the whole is added with 1.8765 kg. of thiamphenicol palmitate, sieved through a sieve at 196 mesh/cm.², with ⅓ of the entire amount of methyl and propyl p.oxybenzoate and with glass pearls having a diameter of 3.5–5 mm. The jar is placed on a suitable roll-mill which is actuated up to obtainment of a satisfactory micronization (average diameter of crystals lower than 4–6μ).

15 liters of distilled water are poured into a container graduated at 45 liters, 28.8 kg. of sugar are added, the solution is kept boiling for some minutes and then the remaining amount of methyl and propyl p.oxybenzoate as well as the sodium benzoate are added; the solution is hot-filtered to eliminate extraneous materials. The content of the jar is directly poured in the syrup containing the flavor while filtering through buchner filter or filtering net, the glass pearls and the jar are washed with water and the washing waters are added to the syrup.

The pH is adjusted to 5.6–5.8 by means of monohydrate citric acid, a citrate buffer is added, the volume is adjusted to 45 liters (or the weight to 56.475 kg.) by means of distilled water and the suspension is passed through a suitable homogenizer. The syrup is subdivided into containers of 60 ml. capacity.

We claim:

1. A therapeutic antibiotic composition having long lasting activity which comprises an antibiotically effective amount of a compound of the formula

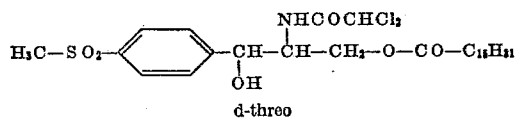

d-threo and a therapeutically acceptable carrier.

References Cited

UNITED STATES PATENTS

| | | | |
|---|---|---|---|
| 2,988,483 | 6/1961 | Barsky et al. | 424—312 |
| 3,227,735 | 1/1966 | DeWitt et al. | 260—404.8 |
| 3,689,643 | 9/1972 | Plotnikoff | 424—319 |
| 3,729,563 | 4/1973 | Cash et al. | 424—308 |
| 3,701,829 | 10/1972 | Baretoleni | 424—319 |

ALBERT T. MEYERS, Primary Examiner

D. M. STEPHENS, Assistant Examiner

UNITED STATES PATENT OFFICE
CERTIFICATE OF CORRECTION

Patent No. 3,803,321  Dated April 9, 1974

Inventor(s) Uberto Maria Teotino et al

It is certified that error appears in the above-identified patent and that said Letters Patent are hereby corrected as shown below:

Column 1, line 70: Please write "after" instead of "ester"

Column 2, line 47: At the bottom of Table 1 "± e.s." instead of "± o.s."

Column 2, line 58: "unaffected" instead of "uneffected"

Column 2, line 58: "in the 1-po-" instead of "in 1-po-"

Column 2, line 62: "trialkylamines" instead of "trialkylamine"

Column 3, line 8: "raises" instead of "rises"

Column 3, line 12: before "Cl-ions" please put "the"

Column 3, line 31: "product is" instead of "producis"

Column 3, line 44: "They" instead of "The y"

Signed and sealed this 24th day of September 1974.

(SEAL)
Attest:

McCOY M. GIBSON JR.
Attesting Officer

C. MARSHALL DANN
Commissioner of Patents